(12) United States Patent
Chen et al.

(10) Patent No.: US 11,442,639 B2
(45) Date of Patent: Sep. 13, 2022

(54) METHOD, APPARATUS, AND STORAGE MEDIUM FOR MANAGING STRIPE IN STORAGE SYSTEM

(71) Applicant: EMC IP Holding Company LLC, Hopkinton, MA (US)

(72) Inventors: Chi Chen, Chengdu (CN); Huijuan Fan, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 101 days.

(21) Appl. No.: 16/989,029

(22) Filed: Aug. 10, 2020

(65) Prior Publication Data

US 2021/0318802 A1 Oct. 14, 2021

(30) Foreign Application Priority Data

Apr. 14, 2020 (CN) .......................... 202010289151.9

(51) Int. Cl.
*G06F 3/00* (2006.01)
*G06F 3/06* (2006.01)

(52) U.S. Cl.
CPC ............ *G06F 3/064* (2013.01); *G06F 3/0604* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 10,402,249 B2 | 9/2019 | Xiao et al. | |
| 10,976,942 B2 | 4/2021 | Zhao et al. | |
| 11,005,970 B2 | 5/2021 | Kamran et al. | |
| 11,023,169 B2 | 6/2021 | Arnold et al. | |
| 11,199,968 B2 | 12/2021 | Dalmatov | |
| 11,262,930 B2 | 3/2022 | Fan et al. | |
| 2015/0277802 A1* | 10/2015 | Oikarinen | ............... G06F 3/064 711/114 |

* cited by examiner

*Primary Examiner* — Midys Rojas
(74) *Attorney, Agent, or Firm* — BainwoodHuang

(57) ABSTRACT

Techniques manage stripes in a storage system. In accordance with such techniques, in the storage system including a plurality of storage devices, a device correlation of a storage device in the plurality of storage devices is determined according to a request for creating a stripe in the storage system. The device correlation indicates distribution of a set of stripes created in the storage system between the storage device and other storage devices than the storage device. One storage device is selected from the plurality of storage devices based on the determined device correlation. One extent in the selected storage device is added to the stripe. As such, all extents in the stripe can be distributed as evenly as possible in the plurality of storage devices in the storage system, thus ensuring load balancing of the storage system and more effective management of the stripes in the storage system.

16 Claims, 11 Drawing Sheets

METHOD, APPARATUS, AND STORAGE MEDIUM FOR MANAGING STRIPE IN STORAGE SYSTEM

CROSS-REFERENCE TO RELATED APPLICATION

This application claims priority to Chinese Patent Application No. CN202010289151.9, on file at the China National Intellectual Property Administration (CNIPA), having a filing date of Apr. 14, 2020, and having "METHOD, APPARATUS, AND STORAGE MEDIUM FOR MANAGING STRIPE IN STORAGE SYSTEM" as a title, the contents and teachings of which are herein incorporated by reference in their entirety.

TECHNICAL FIELD

Various implementations of the present disclosure relate to storage management, and in particular, to a method, a device, and a computer program product for managing stripes in a storage system.

BACKGROUND

With the development of data storage technologies, a variety of data storage devices have been capable of providing an increasingly higher data storage capability for users, and a data access speed has also been greatly improved. The users have increasingly higher requirements for data reliability and a response time of the storage system while the data storage capability is improved. At present, a variety of Redundant Array of Independent Disks (RAID)-based data storage systems have been developed to improve the data reliability. When one or more disks in the storage system fail, data in the failed disk(s) can be reconstructed from data on other disks that are normally operating.

A mapped RAID has been developed at present. In the mapped RAID, a disk is a logical concept and may include a plurality of extents. A plurality of extents included in a logical disk may be distributed across different physical storage devices in a resource pool. For a plurality of extents in a stripe of the mapped RAID, the plurality of extents should be distributed across different physical storage devices. As a result, when a physical storage device where one of the plurality of extents is located fails, a reconstruction operation can be performed to recover data from physical storage devices where other extents are located. At this time, how to select an extent from a plurality of storage systems to create a stripe becomes a technical challenge.

SUMMARY OF THE INVENTION

Therefore, it is desirable to develop and implement a technical solution of more effectively managing stripes in a storage system. It is desirable that the technical solution is compatible with an existing storage system and that the stripes in the storage system are more effectively managed by modifying various configurations of the existing storage system.

According to a first aspect of the present disclosure, a method for managing stripes in a storage system is provided. The storage system includes a plurality of storage devices. In the method, a device correlation of a storage device in the plurality of storage devices is determined according to a request for creating a stripe in the storage system. The device correlation indicates distribution of a set of stripes created in the storage system between the storage device and other storage devices than the storage device. One storage device is selected from the plurality of storage devices based on the determined device correlation. One extent in the selected storage device is added to the stripe.

According to a second aspect of the present disclosure, an electronic device is provided, including: at least one processor; and a memory coupled to the at least one processor. The memory has instructions stored therein. When executed by the at least one processor, the instructions cause the device to execute actions for managing stripes in a storage system. The storage system includes a plurality of storage devices. The actions include: determining a device correlation of a storage device in the plurality of storage devices according to a request for creating a stripe in the storage system, the device correlation indicating distribution of a set of stripes created in the storage system between the storage device and other storage devices than the storage device; selecting one storage device from the plurality of storage devices based on the determined device correlation; and adding one extent in the selected storage device to the stripe.

According to a third aspect of the present disclosure, a computer program product is provided. The computer program product is tangibly stored on a non-transitory computer-readable medium and includes machine-executable instructions that are configured to perform the method according to the first aspect of the present disclosure.

BRIEF DESCRIPTION OF THE DRAWINGS

The features, advantages, and other aspects of the implementations of the present disclosure will become more apparent with reference to the accompanying drawings and the following detailed descriptions. Several implementations of the present disclosure are illustrated herein by way of example rather than in a restrictive manner. In the drawings, FIG. 1A and FIG. 1B each schematically illustrate a block diagram of a storage system in which the implementations of the present disclosure can be implemented.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred implementations of the present disclosure will be described in more detail below with reference to the accompanying drawings. Although the preferred implementations of the present disclosure are illustrated in the accompanying drawings, it should be understood that the present disclosure may be implemented in various forms and should not be limited by the implementations illustrated herein. Rather, these implementations are provided to make the present disclosure more thorough and complete and to fully convey the scope of the present disclosure to those skilled in the art.

The term "include/comprise" and its variations as used herein mean open-ended inclusion, i.e., "including/comprising, but not limited to." Unless specifically stated otherwise, the term "or" indicates "and/or." The term "based on" indicates "based at least in part on." The terms "an example implementation" and "an implementation" indicate "at least one example implementation." The term "another implementation" indicates "at least one additional implementation." The terms "first," "second," and the like may refer to different or identical objects. Other explicit and implicit definitions may also be included below.

In the context of the present disclosure, the storage system may be a RAID-based storage system. The RAID-based storage system may combine a plurality of storage devices into an array of disks. By providing redundant storage devices, reliability of an entire disk pack can be significantly higher than that of a single storage device. The RAID can provide various advantages over the single storage device, for example, enhanced data integration, enhanced fault tolerance, increased throughput or capacity, and so on. The RAID includes a plurality of standards, for example, RAID-1, RAID-2, RAID-3, RAID-4, RAID-5, RAID-6, RAID-10, RAID-50, and so on.

Figure 1A:
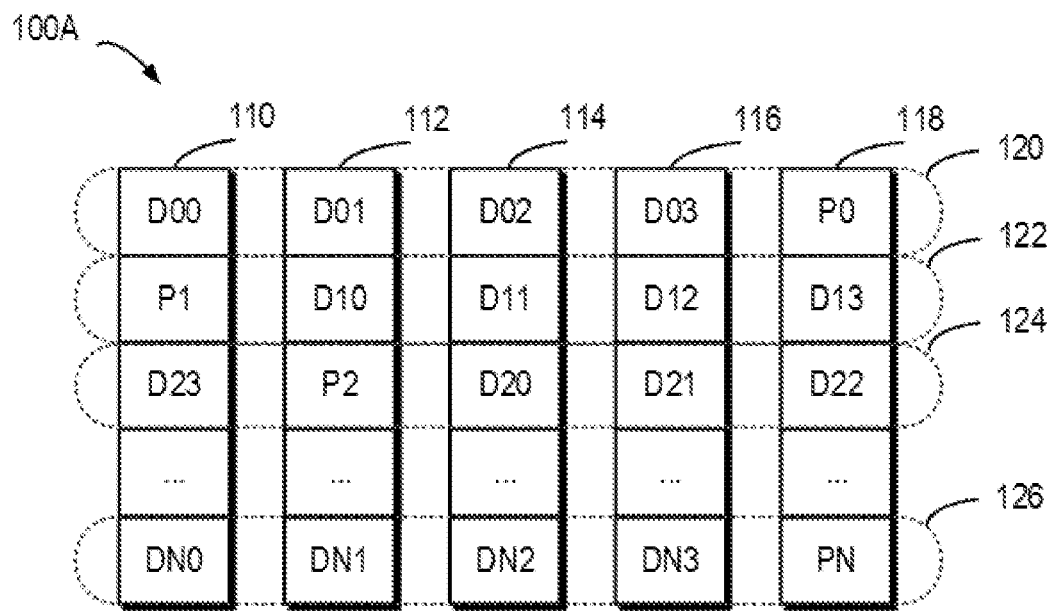

FIG. 1A schematically illustrates a block diagram of storage system 100A in which a method of the present disclosure can be implemented. In the storage system illustrated in FIG. 1A, the working principle of the RAID is described by taking a RAID-5 (4D+1P, where 4D indicates that the storage system includes four storage devices configured to store data, and 1P indicates that the storage system includes one storage device configured to store P parity) array including five independent storage devices (110, 112, 114, 116, and 118) as an example. It should be noted that although FIG. 1A schematically illustrates five storage devices, in other implementations, more or fewer storage devices may also be included according to different levels of the RAID. Although stripes 120, 122, 124, . . . , and 126 are shown in FIG. 1A, in other examples, the RAID system may also include a different number of stripes.

In the RAID, a stripe may span a plurality of physical storage devices (for example, stripe 120 spans storage devices 110, 112, 114, 116, and 118). A stripe can simply be understood as a storage area in a plurality of storage devices that satisfies a certain address range. Data stored for stripe 120 includes a plurality of parts: data block D00 stored on storage device 110, data block D01 stored on storage device 112, data block D02 stored on storage device 114, data block D03 stored on storage device 116, and data block P0 stored on storage device 118. In this example, data blocks D00, D01, D02, and D03 are stored data, while data block P0 is P parity for the stored data.

The manner of storing data in other stripes 122 and 124 is also similar to that in stripe 120, except that parity for other data blocks can be stored on a storage device other than storage device 118. In this way, when a storage device in the plurality of storage devices 110, 112, 114, 116, and 118 fails, data in the failed device can be recovered from other normal storage devices.

Figure 1B:
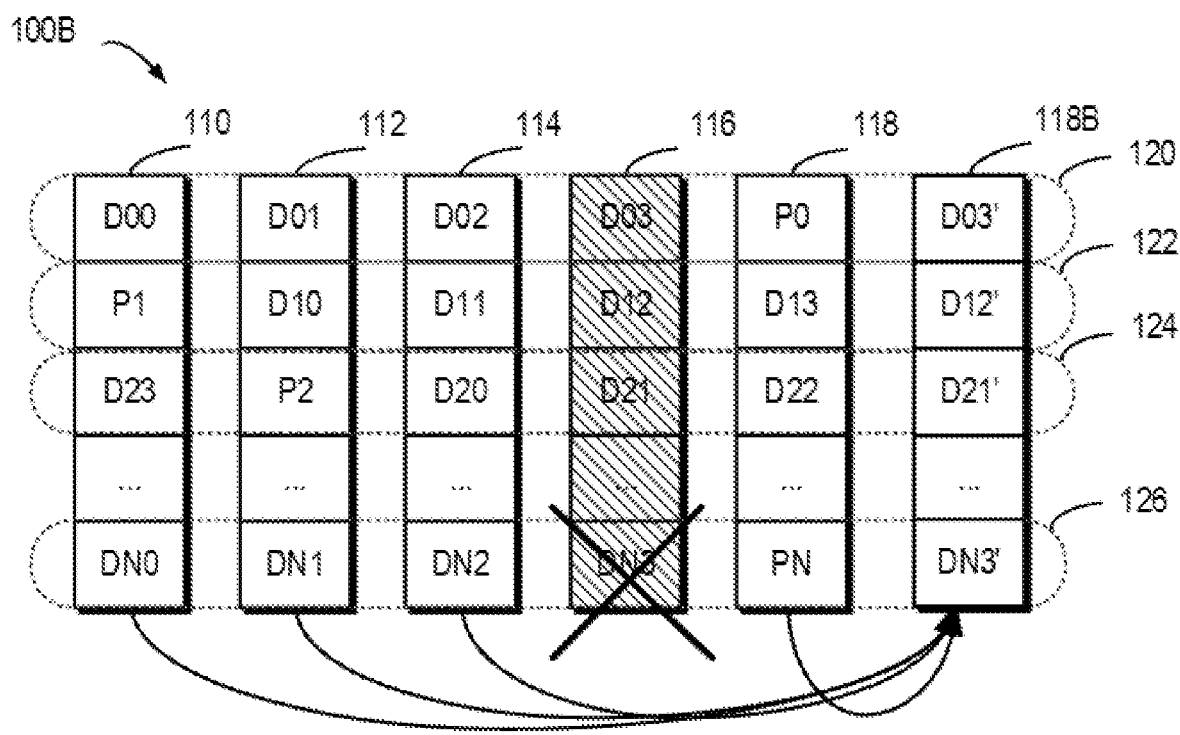

FIG. 1B schematically illustrates schematic diagram 100B of a reconstruction process for storage system 110A. As shown in FIG. 1B, when a storage device (e.g., storage device 116 shown in hatched lines) fails, data can be recovered from the remaining storage devices 110, 112, 114, and 118 that are normally operating. At this time, a new backup storage device 118B can be added to the RAID to replace storage device 118. In this way, the recovered data can be written to 118B and the system can be reconstructed.

It should be noted that although the RAID-5 storage system including five storage devices (where four storage devices are configured to store data, and one storage device is configured to store parity) is described above with reference to FIG. 1A and FIG. 1B, a storage system including other number of storage devices may also exist according to definitions of other RAID levels. For example, parities P and Q may be stored using two storage devices respectively based on the definition of RAID-6. For another example, parities P, Q, and R may be stored using three storage devices respectively based on the definition of a triple parity RAID.

Figure 2:
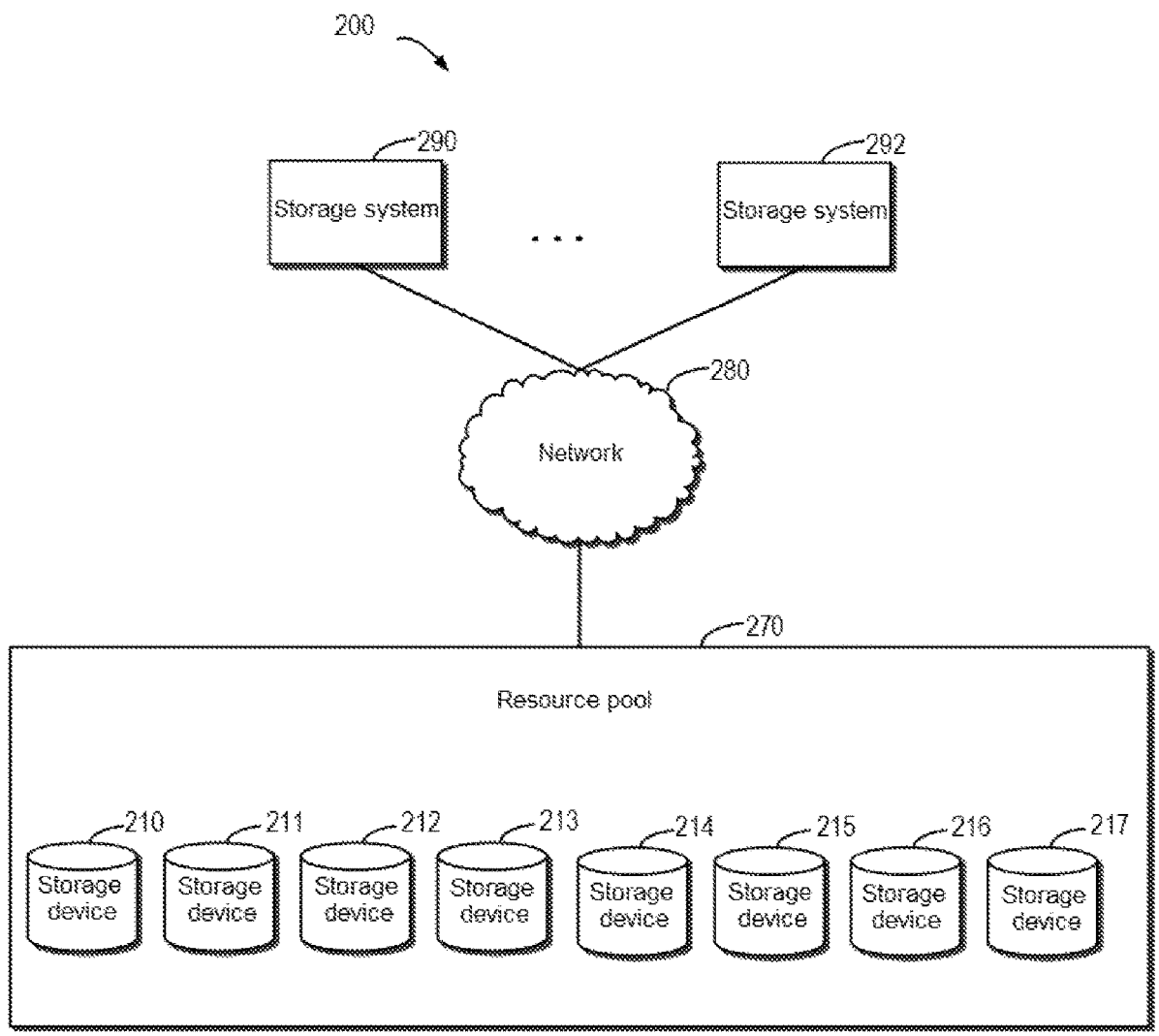
FIG. 2 schematically illustrates a block diagram of an example environment in which the implementations of the present disclosure can be implemented.

With the development of distributed storage technologies, storage devices 110, 112, 114, 116, and 118 in the storage system illustrated in FIG. 1A and FIG. 1B may no longer be limited to physical storage devices, but may be virtual storage devices. For example, various extents on storage device 110 may be from different physical storage devices (hereinafter referred to as storage devices) in a resource pool respectively. FIG. 2 schematically illustrates a block diagram of an example environment in which a method of the present disclosure can be implemented. As shown in FIG. 2, storage resource pool 270 may include a plurality of physical storage devices 210, 211, 212, 213, 214, 215, 216, and 217. At this time, storage spaces in the plurality of storage devices can be allocated to storage systems 290, . . . , and 292 of a plurality of users. At this time, storage systems 290, ..., and 292 of the users can access the storage spaces in the storage devices in storage resource pool 270 over network 280. It will be understood that although FIG. 2 only schematically illustrates that storage resource pool 270 includes eight storage devices, according to an example implementation of the present disclosure, storage resource pool 270 may also include more or fewer storage devices.

Figure 3:
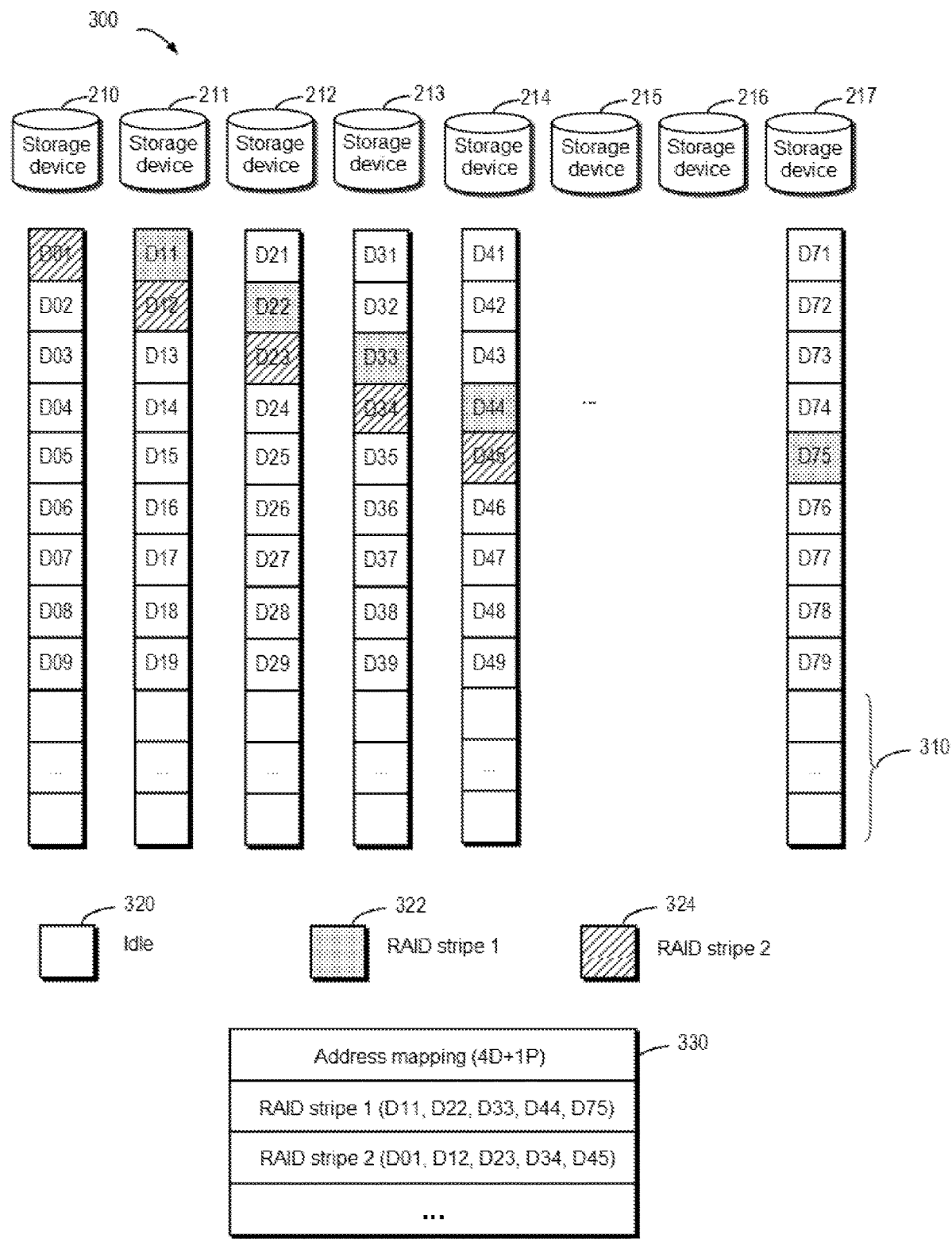
FIG. 3 schematically illustrates a diagram of the storage resource pool in FIG. 2.

FIG. 3 schematically illustrates a diagram of more information of storage resource pool 270 as shown in FIG. 2. Resource pool 270 may include a plurality of storage devices 210 to 217. Each storage device may include a plurality of extents, in which reference number 320 denotes idle extents, reference number 322 denotes extents for RAID stripe 1, and reference number 324 denotes extents for RAID stripe 2. At this time, extents D11, D22, D33, and D44 for RAID stripe 1 are configured to store data blocks of the stripe respectively, and extent D75 is configured to store data parity. Extents D01, D12, D23, and D34 for RAID stripe 2 are configured to store data blocks of the stripe respectively, and extent D45 is configured to store data parity.

As shown in FIG. 3, address mapping 330 shows an association between a stripe and addresses of extents in the stripe. For example, RAID stripe 1 may include five extents: D11, D22, D33, D44, and D75, and the five extents are located in storage devices 211, 212, 213, 214, and 217 respectively. Specifically, as shown in FIG. 3, extent D11 is a first extent in storage device 211, and extent D22 is a second extent in storage device 212. As shown in FIG. 3, reserved idle portion 310 may also exist in each storage device, so that when a storage device in the resource pool fails, extents in idle portion 310 in each storage device can be selected to reconstruct each extent in the failed storage device.

It should be noted that FIG. 3 illustrates how extents in each stripe are distributed in a plurality of storage systems in a resource pool by taking only a RAID-5 storage system of 4D+1P as an example. When using other RAID levels, those skilled in the art can implement the details based on the above principle. For example, in a RAID-6 storage system of 6D+1P+1Q, eight extents in each stripe can be distributed across a plurality of storage devices.

At present, technical solutions of selecting a storage device based on a polling method and/or a random method and creating stripes based on idle extents in the selected storage device have been proposed. However, the technical solutions cannot guarantee that the extents in the stripe are evenly distributed among the plurality of storage devices. Uneven distribution may lead to much higher usage and read/write volumes for some storage devices than others and cause an access bottleneck. Further, this may take a too long time to reconstruct the storage devices and may face a higher risk of data loss.

In order to address the above defects, a method, a device, and a computer program product for managing stripes in a storage system are provided in implementations of the present disclosure. According to an example implementation of the present disclosure, the concept of device correlation of a storage device is proposed. The device correlation herein indicates distribution of a set of stripes created in the storage system between the storage device and other storage devices than the storage device. For ease of description, more details of the example implementation of the present disclosure are described below by only taking a RAID stripe of 4D+1P as an example of a stripe.

The RAID stripe of 4D+1P includes five extents, and data in the five extents is generally associatively accessed. This leads to an increase in access traffic to the five storage devices in the five extents. Generally, for any two storage devices, the larger the number of stripes jointly served by the two storage devices, the higher a likelihood that the two storage devices are accessed at the same time, and the higher the workloads of the two storage devices. Therefore, it should prevent two storage devices from serving too many stripes at the same time as much as possible.

Figure 4:
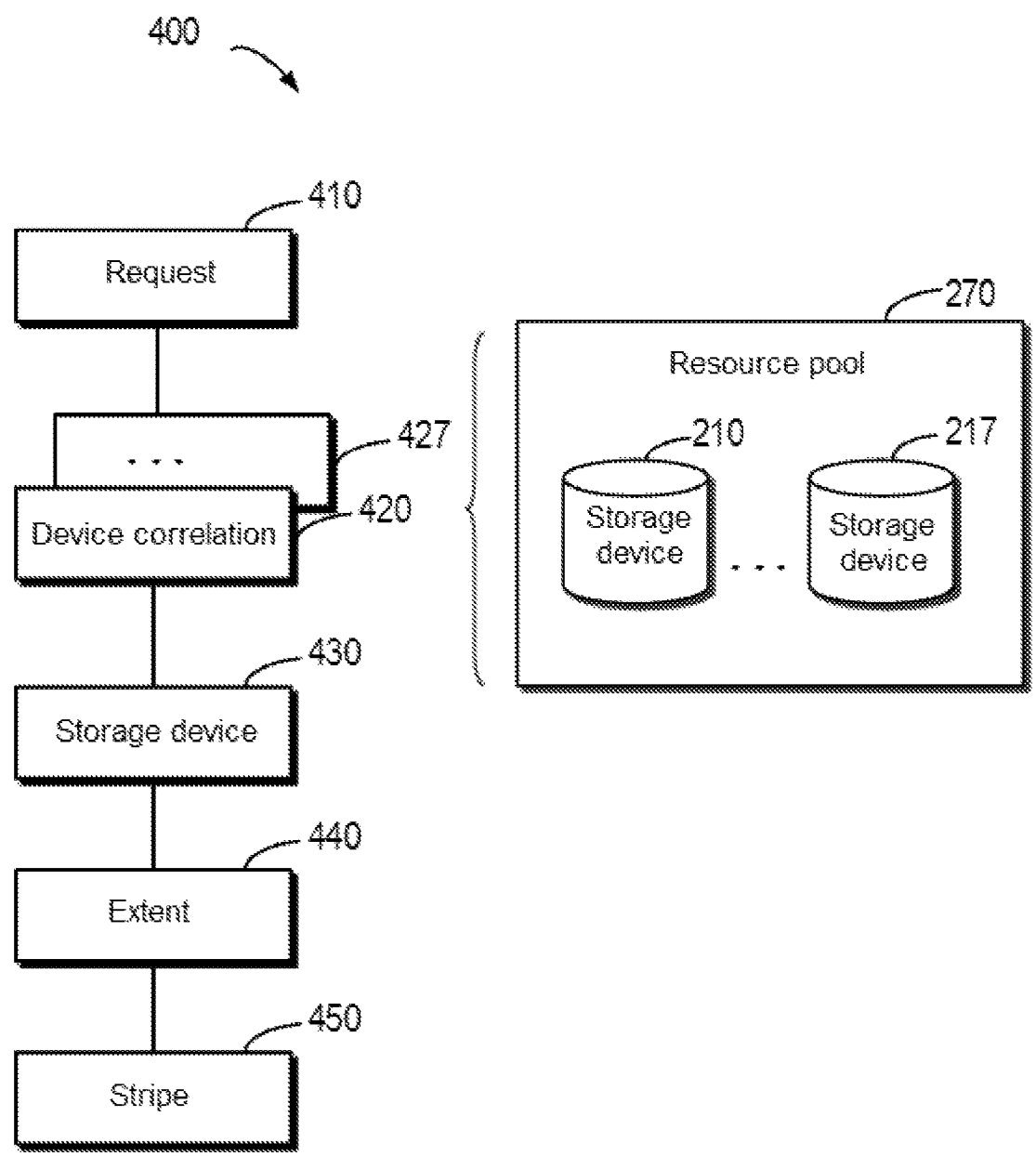
FIG. 4 schematically illustrates a block diagram of a process for managing stripes in a storage system according to an implementation of the present disclosure.

FIG. 4 schematically illustrates block diagram 400 of a process for managing stripes in a storage system according to an implementation of the present disclosure. As shown in FIG. 4, resource pool 270 of the storage system may include a plurality of storage devices 210 to 217. When request 410 for creating a stripe in the storage system is received, a device correlation of a storage device in the plurality of storage devices can be determined. It will be understood that the device correlations and the storage devices may have a one-to-one corresponding relationship. For example, device correlation 420 of storage device 210 may be determined based on distribution of a set of created stripes between storage device 210 and other storage devices. Similarly, device correlation 427 of storage device 217 may be determined, and a device correlation of each storage device may further be determined.

When the device correlation of each storage device has been determined, the device correlations can be compared so as to select storage device 430 from the plurality of storage devices 210 to 217. Then, idle extent 440 may be selected from storage device 430 to create stripe 450. Extent 440 may be used as a first extent and added to stripe 450. In the following, more details of an example implementation of the present disclosure will be described with reference to FIG. 5.

Figure 5:
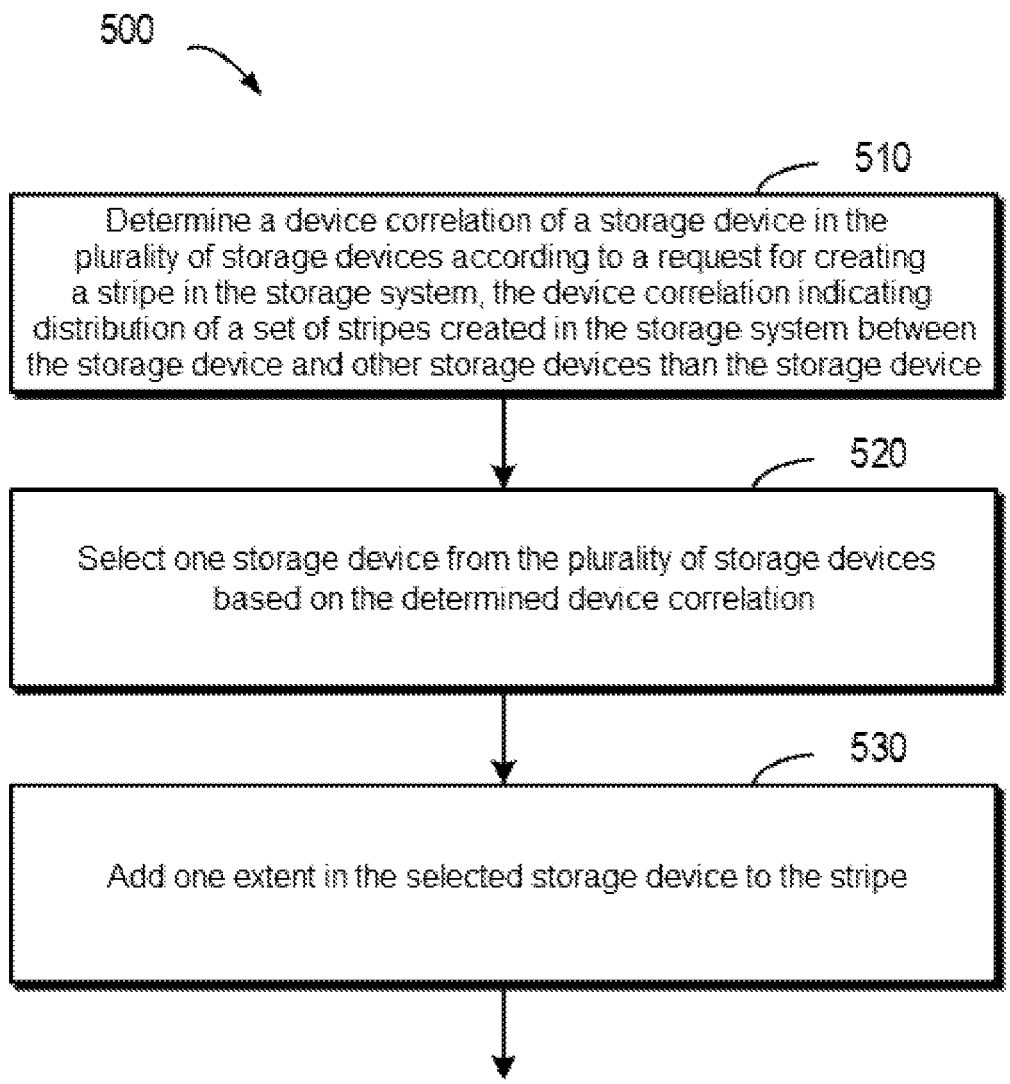
FIG. 5 schematically illustrates a block diagram of a method for managing stripes in a storage system according to an implementation of the present disclosure.

FIG. 5 schematically illustrates block diagram 500 of a method for managing stripes in a storage system according to an implementation of the present disclosure. In block 510, a device correlation of a storage device in a plurality of storage devices is determined according to request 410 for creating a stripe in the storage system. In the context of the present disclosure, M is used to represent the number of the storage devices in the storage system, and N is used to represent a width of the stripe. Assuming that the storage system includes eight storage devices 210 to 217, M=8. When an RAID of 4D+1P is adopted, N=4+1=5.

In the following, the concept of correlation between two storage devices is introduced first. For the ith storage device and the jth storage device (i≠j) in the plurality of storage devices, correlation between the two storage devices can be expressed as $\gamma_{Disk\ i, Disk\ j}$. According to an example implementation of the present disclosure, a correlation of a storage device itself can be set to 0, that is, $\gamma_{Disk\ i, Disk\ i} = 0$.

It will be understood that in an initial stage of running of the storage system, the storage system does not include any stripe, and at this time, five extents in any five storage devices can be selected to create a stripe. After the storage system has run for a period of time, the storage system may include a set of stripes created. At this time, in the set of stripes, the number of stripes which involve two particular storage devices at the same time can be determined, and a correlation between the two particular storage devices is set based on the determined number. Specifically, how to determine the correlation $\gamma_{Disk\ i, Disk\ j}$ between the ith storage device and the jth storage device will be described with reference to FIG. 6.

Figure 6:
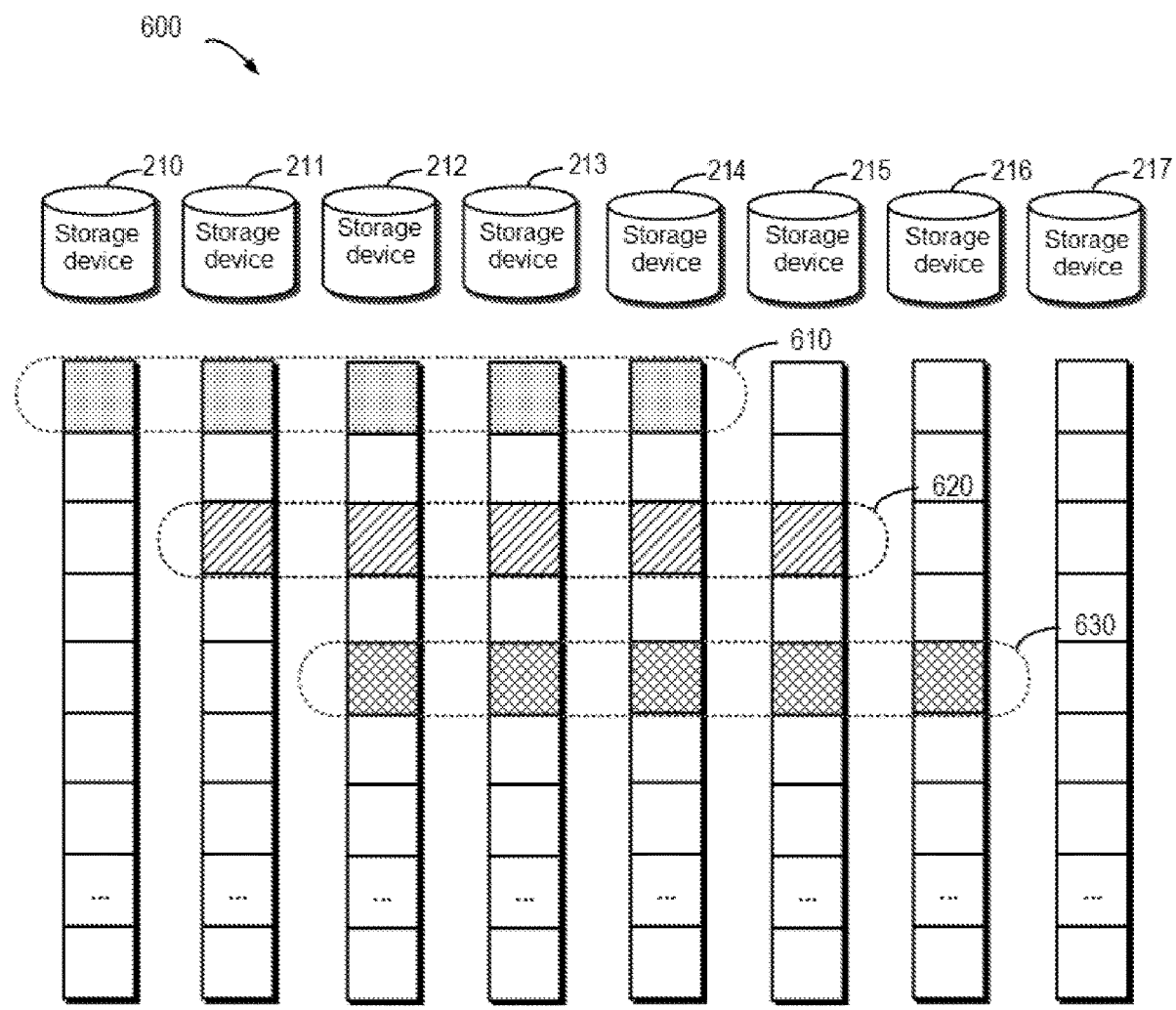
FIG. 6 schematically illustrates a block diagram of a process for determining a correlation between two storage devices according to an implementation of the present disclosure.

FIG. 6 schematically illustrates block diagram 600 of a process for determining a correlation between two storage devices according to an implementation of the present disclosure. As shown in FIG. 6, three stripes 610, 620, and 630 have been created in the storage system, and a correlation $\gamma_{Disk\ i, Disk\ j}$ may be determined based on the number of stripes jointly involving the ith storage device and the jth storage device. If it is intended to determine a correlation between storage device 210 and storage device 211 (i.e., i=0, j=1), it can be found that only stripe 610 uses extents in storage device 210 and storage device 211 at the same time, and thus $\gamma_{Disk\ 0, Disk\ 1}=1$.

For another example, if it is intended to determine a correlation between storage device 211 and storage device 212 (i.e., i=1, j=2), it can be found that stripe 610 uses extents in storage device 210 and storage device 211 at the same time and that stripe 620 also uses the extents in storage device 210 and storage device 211 at the same time, and thus $\gamma_{Disk\ 1, Disk\ 2}=2$. Similarly, a correlation between any two storage devices in the plurality of storage devices can be determined. It will be understood that a mapping relationship between a stripe and extents in the stripe can be easily acquired from address mapping 330 of the storage system. Therefore, a correlation between any two storage devices can be determined in a simple and effective way with the example implementation of the present disclosure.

According to an example implementation of the present disclosure, a device correlation of a particular storage device in the plurality of storage devices may be determined based on a correlation between two storage devices. Specifically, a correlation between the particular storage device and each of other storage devices than the particular storage device can be determined respectively. Further, the device correlation of the particular storage device may be determined based on the determined correlations.

According to an example implementation of the present disclosure, the device correlation may be set to be positively proportional to the correlation between the storage device and each of the other storage devices. For example, a sum of a plurality of correlations may be acquired, and the device correlation may be determined based on a summation operation. With the example implementation of the present disclosure, the device correlation of the particular storage device can be determined based on the correlations between the particular storage device and the other storage devices according to a simple mathematical operation.

Suppose it is intended to determine a device correlation of the ith storage device, a correlation between the ith storage device and the jth storage device ($0 \le j \le M-1$, and $i \ne j$) can be determined based on the method described above with reference to FIG. 6. According to an example implementation of the present disclosure, the device correlation $\gamma_{Disk\ i}$ of the ith storage device may be determined based on the following formula 1:

$$\gamma_{Disk\ i} = \sum_{j=0}^{M-1} \gamma_{Disk\ i, Disk\ j} \qquad \text{Formula 1}$$

where $\gamma_{Disk\ i}$ denotes the device correlation of the ith storage device, $\gamma_{Disk\ i, Disk\ j}$ denotes the correlation between the ith storage device and the jth storage device, and M denotes the number of storage devices in the resource pool.

With the example implementation of the present disclosure, for the ith storage device, the device correlation $\gamma_{Disk\ i}$ of the device denotes a sum of correlations between the ith storage device and other M−1 storage devices. At this time, the device correlation can accurately measure a degree at which the ith storage device is correlated to other storage devices and can reflect the workload of the storage device.

When a storage device for creating a stripe is selected based on a device correlation, an appropriate storage device conducive to achieve load balancing can be accurately selected based on the workload of each storage device.

It will be understood that formula 1 above only schematically shows a specific example for determining a device correlation. According to an example implementation of the present disclosure, the device correlation may also be determined using other formulas. For example, the device correlation may be determined based on a product of a plurality of correlations.

How to determine the device correlation $\gamma_{Disk\ i}$ of the ith storage device has been described above. After the device correlation of each storage device has been determined, a storage device can be selected from the plurality of storage devices based on the device correlation. Referring back to FIG. 5, in block 520, a storage device is selected from the plurality of storage devices based on the determined device correlation. According to an example implementation of the present disclosure, a storage device with a low device correlation may be selected from the plurality of storage devices. Assuming that the device correlation $\gamma_{Disk\ i}$ of the ith storage device in the plurality of storage devices is smaller than the device correlation $\gamma_{Disk\ j}$ of the jth storage device in the plurality of storage devices, the ith storage device can be selected.

With the example implementation of the present disclosure, a storage device with the lowest workload can be preferentially selected based on the device correlation, so that the created stripe can make the best use of a storage device in a better working state in the resource pool. According to an example implementation of the present disclosure, the device correlations of the storage devices may be compared, and an extent in a storage device with a minimum device correlation is selected as a first extent in the stripe. In this way, the stripe can be created by using an extent in a storage device with the lowest workload as much as possible.

Still referring to FIG. 5, in block 530, one extent in the selected storage device is added to the stripe. Assuming that the ith storage device has a minimum device correlation, an idle extent can be selected from the ith storage device and added to the stripe. Following the example above, assuming that the 0th storage device has a minimum device correlation, an idle extent in the 0th storage device can be selected and added to the stripe. At this time, a first extent in the stripe has been selected. With the example implementation of the present disclosure, by selecting an extent in a storage device with a minimum device correlation to create a stripe, it can be ensured that a first extent in the stripe is located in a storage device currently performing better, thereby ensuring access performance of the entire stripe.

It will be understood that compared with the existing technical solution of selecting a first extent based on a polling method and/or a random method, the method of the present disclosure can ensure that a first extent in a stripe is selected in a simple and effective way. Even if other technical solutions are subsequently used to select the remaining extents in the stripe, it can also be ensured that the first extent is located in a storage device performing better and that a better access speed can be provided subsequently.

How to select the first extent in the stripe has been described above. In the following, how to select other extents in the stripe will be described. According to an example implementation of the present disclosure, a concept of a stripe correlation is proposed. The stripe correlation herein describes a correlation between a storage device and a plurality of storage devices where a stripe is located. A higher stripe correlation indicates a closer relationship between the storage device and the stripe. For example, a stripe correlation $\gamma_{Disk\ i,RE\ k}$ between the ith storage device and the kth stripe may be determined based on the following formula 2.

$$\gamma_{Disk\ i,RE\ k} = \sum_{Disk\ j \in RE\ k} \gamma_{Disk\ i,Disk\ j} \quad \text{Formula 2}$$

where $\gamma_{Disk\ i,RE\ k}$ denotes the stripe correlation between the ith storage device and the kth stripe, $\gamma_{Disk\ i,Disk\ j}$ denotes the correlation between the ith storage device and the jth storage device, M denotes the number of storage devices in the resource pool, and the jth storage device denotes various storage devices including extents in the kth stripe.

With the example implementation of the present disclosure, a correlation between a storage device and a storage device where each extent in a stripe is located can reflect a degree of closeness between the storage device and each storage device involved in the stripe. A degree of closeness between a device and a stripe can be determined in a simple and effective way by summing a plurality of correlations.

It will be understood that since a plurality of extents in a stripe need to be located in different storage devices, the stripe needs to be created by selecting an extent from other storage devices not involved in the stripe. At this time, a set of storage devices involved in the stripe and a set of storage devices not involved in the stripe can be determined. In an initial stage of creation of the stripe, the stripe includes only an extent in one storage device. Subsequent second, third, fourth, and fifth extents may be gradually determined.

Specifically, in the plurality of storage devices, a first set of storage devices not including any extent in the stripe may be determined, and a second set of storage devices including an extent in the stripe may be determined. For a given storage device in the first set of storage devices, a device correlation between the given storage device and each storage device in the second set of storage devices may be determined respectively, and then a stripe correlation between the given storage device and the stripe may be determined.

Following the example above, the stripe includes only an extent in the 0th storage device at the beginning, and at this time, four other storage devices can be selected from the 1st to 7th storage devices. A stripe correlation between the ith storage device ($1 \leq i \leq 7$) and the stripe (including only the extent in the 0th storage device) may be determined respectively based on formula 2 described above.

A storage device in the first set of storage devices may be selected based on the determined stripe correlation. According to an example implementation of the present disclosure, it is desired that an overall correlation between various storage devices where the extents in the created stripe are located is as small as possible, and thus an extent in a storage device with a small stripe correlation can be preferentially selected. Further, one idle extent in the selected storage device may be added to the stripe. With the example implementation of the present disclosure, each time the next extent in a stripe is selected, an extent in a storage device with a small correlation can be selected in a simple and effective way by using a stripe correlation.

Specifically, a storage device with a low stripe correlation may be selected from the plurality of storage devices. Assuming that a first stripe correlation of a first storage device in the plurality of storage devices is lower than a second stripe correlation of a second storage device in the plurality of storage devices, the first storage device can be selected. With the example implementation of the present disclosure, a storage device with a low correlation with a device where an extent in a current stripe is located can be selected based on the stripe correlation, so that various storage devices where various extents in the created stripe are located are not closely related to each other.

According to an example implementation of the present disclosure, each of the stripe correlations of the storage devices may be compared, and an extent in a storage device with a minimum stripe correlation is selected as a subsequent extent in the stripe. In this way, a storage device more distantly related to one or more storage devices involved in the current stripe can be used as much as possible, so that the stripe can run with high performance.

For convenience of description, a symbol $\gamma_{Disk\ i,RE\ current}$ may be used to represent a stripe correlation between the ith storage device and the current stripe. RE current indicates a storage device where an extent in the current stripe is located. In order to determine a second extent in the stripe, a storage device with a minimum stripe correlation can be selected. Assuming that the 1st storage device has a minimum stripe correlation with the stripe, an idle extent in the 1st storage device can be selected and added to the stripe. At this time, the stripe can include two extents: an extent located in the 0th storage device and an extent located in the 1st storage device.

It will be understood that since the number of extents in a stripe is determined by a width N of the stripe, the above steps can be repeated while the number of the extents in the stripe is lower than N. According to an example implementation of the present disclosure, the width of the stripe may be determined first, and it is determined, based on comparison between the number of extents in the current stripe and the width, whether a selection step is performed. Specifically, if the number of extents is lower than the width of the stripe, the next extent is selected; otherwise, the selection operation is stopped. In order to select one or more subsequent extents, a stripe correlation between each selectable storage device and the current stripe can be determined based on formula 2 above, and then an idle extent in a storage device with a minimum stripe correlation is selected.

With the example implementation of the present disclosure, each extent in the stripe can be determined one by one only through simple mathematical calculation. In this way, it can be ensured that a stripe is created by selecting an extent in a storage device most conducive to achieve load balancing from a plurality of storage devices each time.

Selection of one or more subsequent extents based on a stripe correlation has been described above. According to an example implementation of the present disclosure, the storage device may also be selected based on both the stripe correlation and the device correlation of the storage device. It will be understood that a plurality of extents in the stripe will be associatively accessed, and the selection of the storage device based on the stripe correlation may take mutual influences between various storage devices in the created stripe into account. In a subsequent operation process, the performance of the storage device may also be affected by a correlation (i.e., device correlation) between the storage device and another storage device. Therefore, the storage device can be selected based on both the stripe correlation and the device correlation. With the example implementation of the present disclosure, the factors in the above two aspects can be fully considered to improve the overall performance of the storage system.

According to an example implementation of the present disclosure, a combined correlation $\gamma_{Disk\ i,RE\ current}$ between the ith storage device and the current stripe may be determined based on formula 3.

$$\gamma_{Disk\ i,RE\ current} = \gamma_{Disk\ i,RE\ current} + \gamma_{Disk\ i} \quad \text{Formula 3}$$

where $\gamma_{Disk\ i,RE\ current}$ denotes the combined correlation between the ith storage device and the current stripe, $\gamma_{Disk\ i,RE\ current}$ denotes the stripe correlation between the ith storage device and the current stripe, and $\gamma_{Disk\ i}$ denotes the device correlation of the ith storage device. It will be understood that formula 3 is merely a specific example for calculating a combined correlation, and other formulas may be used to determine the combined correlation according to an example implementation of the present disclosure. For example, the combined correlation may be determined based on a product of a stripe correlation and a device correlation.

A method for selecting a first extent in a stripe based on a device correlation and selecting other extents in the stripe based on a stripe correlation and/or a combined correlation has been described above. In the following, how to determine the 1st to 5th extents in the stripe will be gradually described with reference to FIGS. 7A to 7E. In the above storage system, it is assumed that a set of stripes already exists, and matrix M below shows correlations between eight storage devices. For example, a correlation between the ith storage device and the jth storage device is shown at an intersection of row i and column j.

$$M = \begin{bmatrix} 0 & 1 & 9 & 4 & 1 & 3 & 6 & 7 \\ 1 & 0 & 6 & 6 & 8 & 1 & 2 & 3 \\ 9 & 6 & 0 & 8 & 3 & 9 & 1 & 5 \\ 4 & 6 & 8 & 0 & 4 & 3 & 2 & 1 \\ 1 & 8 & 3 & 4 & 0 & 10 & 5 & 7 \\ 3 & 1 & 9 & 3 & 10 & 0 & 4 & 8 \\ 6 & 2 & 1 & 2 & 5 & 4 & 0 & 6 \\ 7 & 3 & 5 & 1 & 7 & 8 & 6 & 0 \end{bmatrix}$$

Figure 7A:
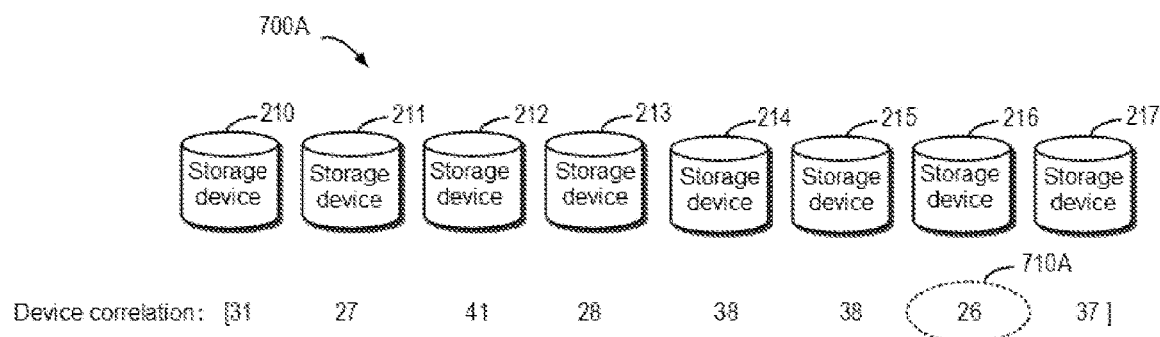
FIG. 7A schematically illustrates a block diagram of a process for selecting a first extent for creating a stripe according to an implementation of the present disclosure.

In order to determine a first extent in the stripe, a device correlation of each of the eight storage devices may be determined first. FIG. 7A schematically illustrates block diagram 700A of a process for selecting a first extent for creating a stripe according to an implementation of the present disclosure. As shown in FIG. 7A, the device correlations of the 0th to 7th storage devices may be expressed as a matrix: [31 27 41 28 33 33 26 37]. As shown in ellipse 710A, the 6th storage device (i.e., storage device 216) has a minimum device correlation, and thus an idle extent in the 6th storage device can be selected and added to the stripe.

Figure 7B:
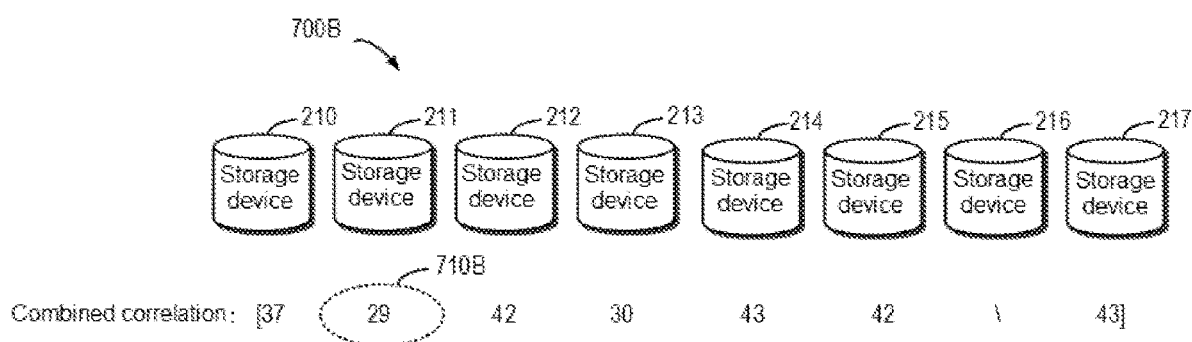
FIG. 7B to FIG. 7E each schematically illustrate a block diagram of a process for selecting other extents for creating stripes according to an implementation of the present disclosure.

FIG. 7B schematically illustrates block diagram 700B of a process for selecting a second extent for creating a stripe according to an implementation of the present disclosure. At this time, the stripe includes an extent in the 6th storage device, and based on the working principle of the RAID, the 6th storage device will be excluded during the selection of subsequent extents. A combined correlation [37 29 42 30 43 42\43] of each device may be determined based on formula 3. Since the 6th storage device has been excluded, the combined correlation of the 6th storage device does not need to be calculated at this time, and the combined correlation of the 6th storage device can be represented with "\." As shown in ellipse 710B, the 1st storage device (i.e., storage device 211) has a minimum combined correlation, and thus an idle extent in the 1st storage device can be selected and added to the stripe.

Figure 7C:
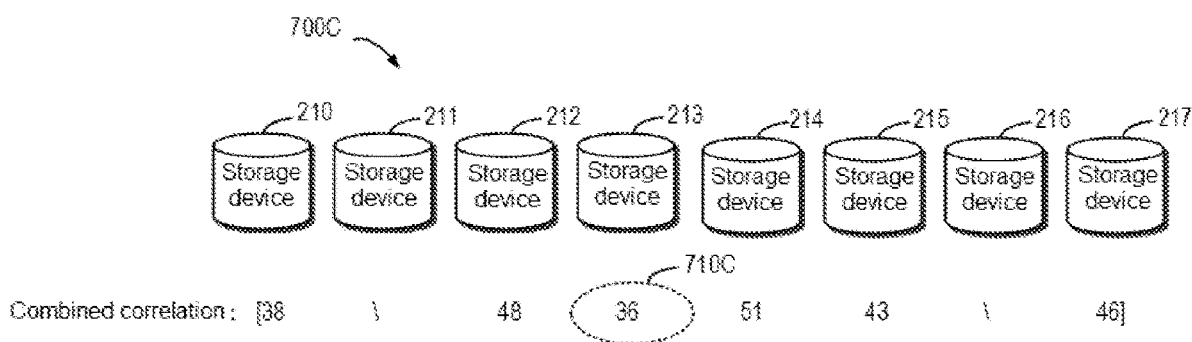

FIG. 7C schematically illustrates block diagram 700C of a process for selecting a third extent for creating a stripe according to an implementation of the present disclosure. At this time, the stripe includes extents in the 6th and 1st storage devices, and thus the 6th and 1st storage devices will be excluded during the selection of subsequent extents. A combined correlation [33 \ 48 36 51 43 \ 46] of each device may be determined based on formula 3. Since the 6th and 1st storage devices have been excluded, the combined correlations of the 6th and 1st storage devices do not need to be calculated at this time. As shown in ellipse 710C, the 3rd storage device (i.e., storage device 213) has a minimum combined correlation, and thus an idle extent in the 3rd storage device can be selected and added to the stripe.

Figure 7D:
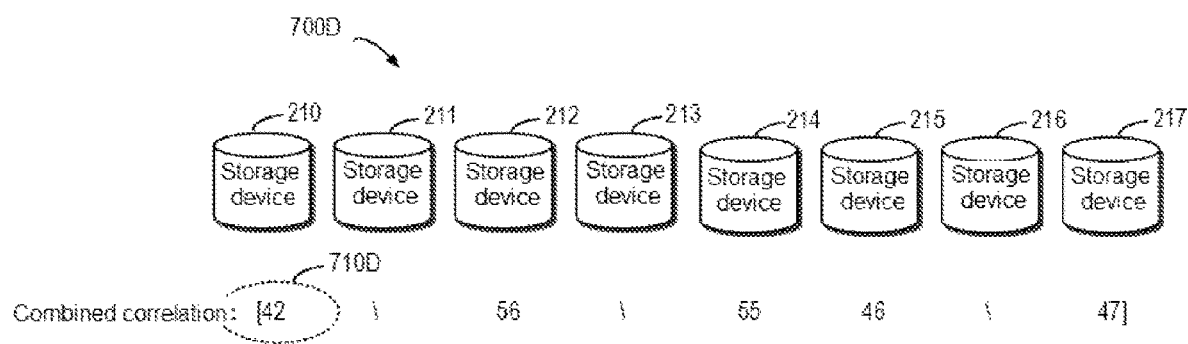

FIG. 7D schematically illustrates block diagram 700D of a process for selecting a fourth extent for creating a stripe according to an implementation of the present disclosure. A combined correlation [42 \ 56 \ 55 46 \ 47] of each device may be determined based on formula 3. As shown in ellipse 710D, the 0th storage device (i.e., storage device 210) has a minimum combined correlation, and thus an idle extent in the 0th storage device can be selected and added to the stripe.

Figure 7E:
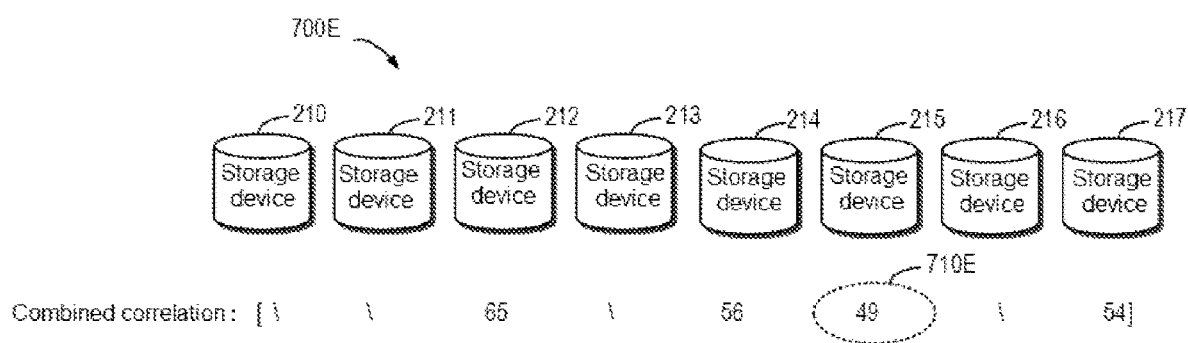

FIG. 7E schematically illustrates block diagram 700E of a process for selecting a fifth extent for creating a stripe according to an implementation of the present disclosure. A combined correlation [\ \ 65 \ 56 49 \ 54] of each device may be determined based on formula 3. As shown in ellipse 710E, the 5th storage device (i.e., storage device 215) has a minimum combined correlation, and thus an idle extent in the 5th storage device can be selected and added to the stripe.

Figure 8:
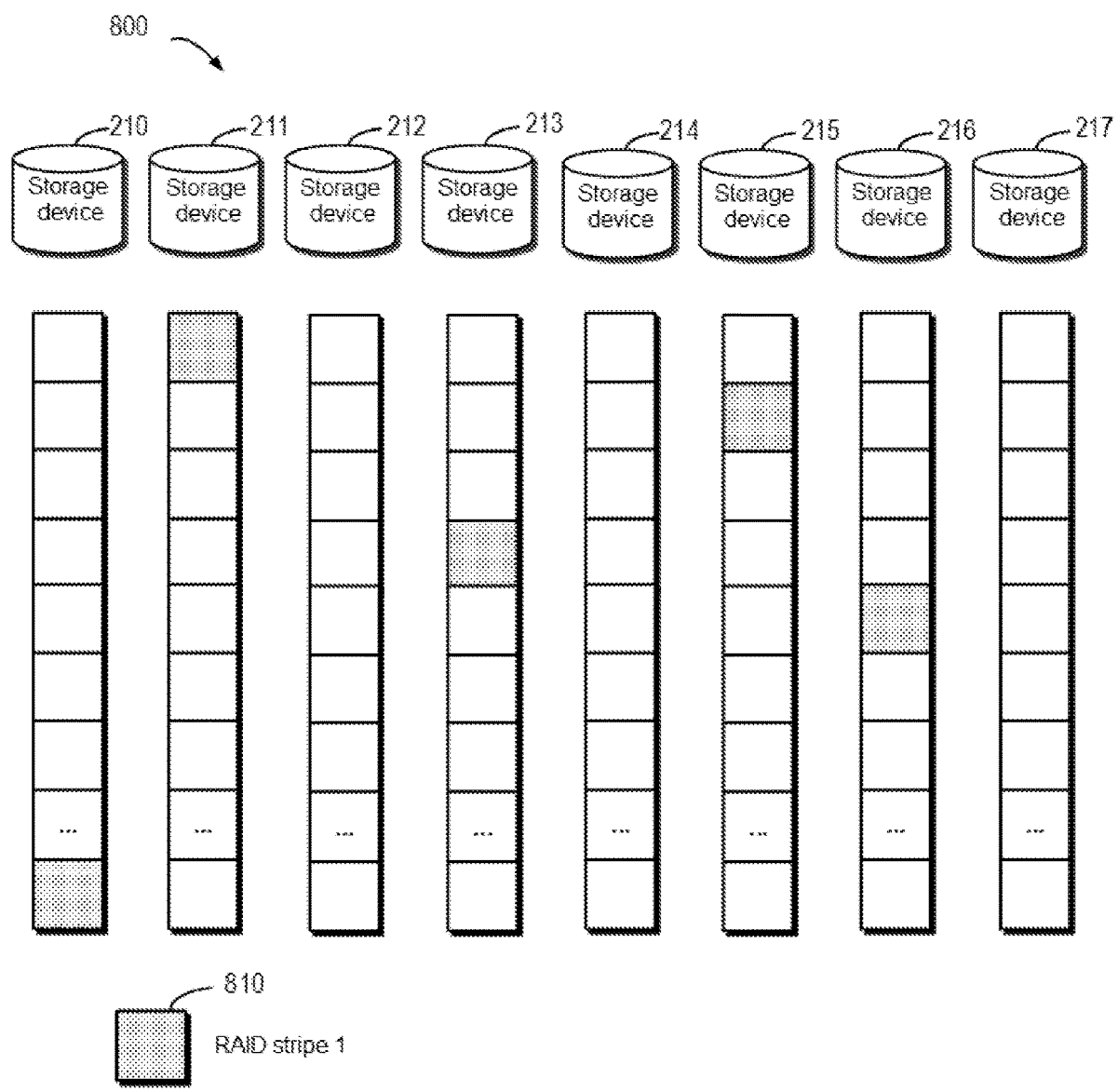
FIG. 8 schematically illustrates a block diagram of a stripe created according to an implementation of the present disclosure.

The five extents in the stripe can be gradually determined using the method described with reference to FIG. 7A to FIG. 7E. FIG. 8 schematically illustrates block diagram 800 of a stripe created according to an implementation of the present disclosure; Reference number 810 indicates RAID stripe 1 newly created, and at this time, a selected extent is located in the 0th, 1st, 3rd, 5th, and 6th storage devices respectively. After RAID stripe 1 has been created, correlations between various storage devices in the storage system may be updated as the following matrix M'.

$$M' = \begin{bmatrix} 0 & 2 & 9 & 5 & 1 & 4 & 7 & 7 \\ 2 & 0 & 6 & 7 & 8 & 2 & 3 & 3 \\ 9 & 6 & 0 & 8 & 3 & 9 & 1 & 5 \\ 5 & 7 & 8 & 0 & 4 & 4 & 3 & 1 \\ 1 & 8 & 3 & 4 & 0 & 10 & 5 & 7 \\ 4 & 2 & 9 & 4 & 10 & 0 & 5 & 8 \\ 7 & 3 & 1 & 3 & 5 & 5 & 0 & 6 \\ 7 & 3 & 5 & 1 & 7 & 8 & 6 & 0 \end{bmatrix}$$

With the example implementation of the present disclosure, it can be ensured that extents in a newly created stripe can be evenly distributed in a plurality of storage devices and that the workloads and performance of the plurality of storage devices are balanced as much as possible.

Figure 9:
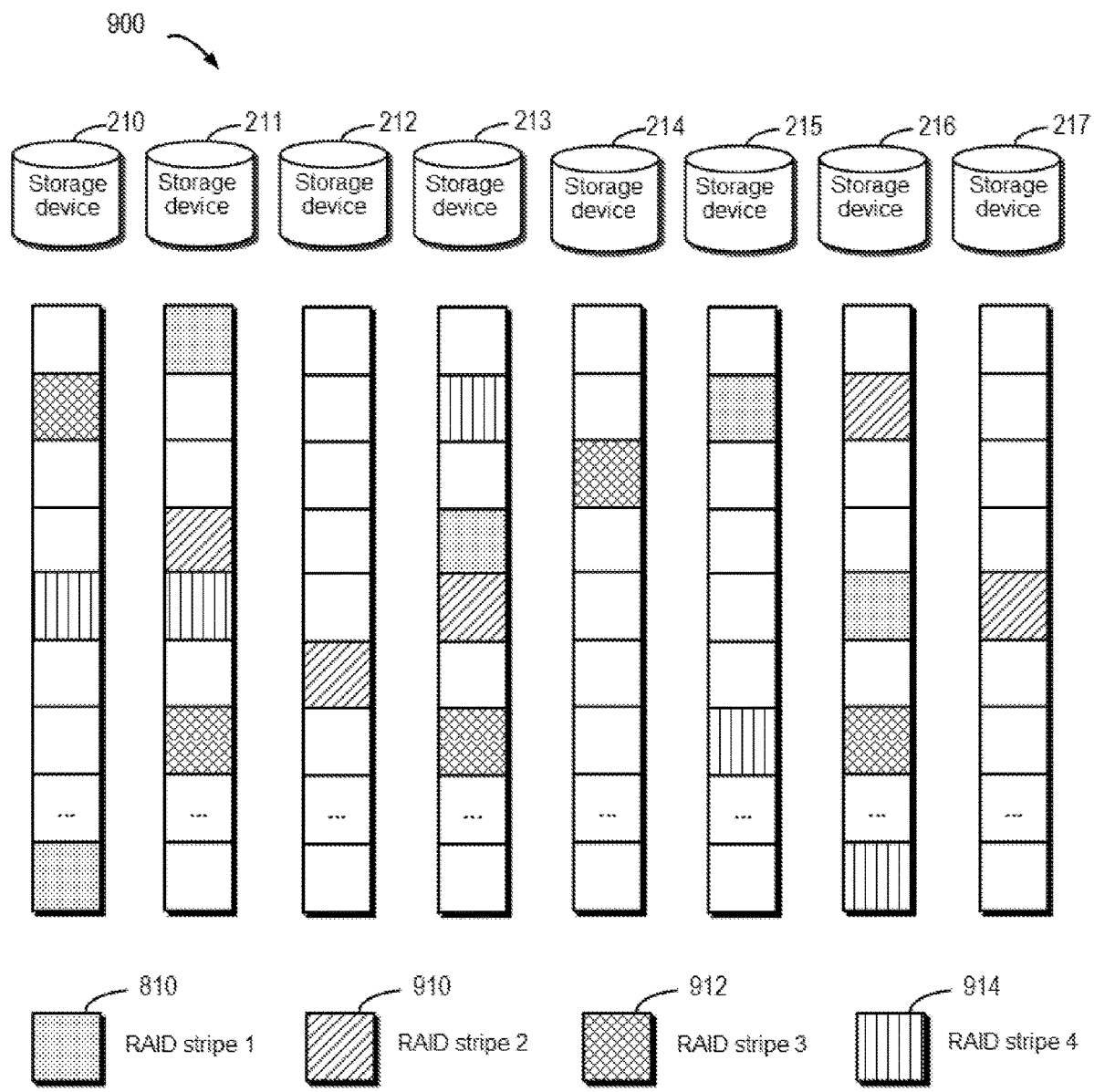
FIG. 9 schematically illustrates a block diagram of a plurality of stripes created according to an implementation of the present disclosure.

According to an example implementation of the present disclosure, one or more other stripes may also be created using a similar method. FIG. 9 schematically illustrates block diagram 900 of a plurality of stripes created according to an implementation of the present disclosure. Referring to FIG. 9, four stripes created according to the method described above are shown: reference number 810 shows extents in RAID stripe 1, reference number 910 shows extents in RAID stripe 2, reference number 912 shows extents in RAID stripe 3, and reference number 914 shows extents in RAID stripe 4.

Distribution of correlations after the four stripes are created according to method 500 may be determined based on a probability distribution method. Specifically, a correlation of the storage system may be determined. The correlation may be determined, for example, based on a sum of the correlations between all the storage devices in the storage system. According to an example implementation of the present disclosure, the correlation $\gamma_{StorageSystem}$ of the storage system may be determined based on the following formula 4.

$$\gamma StorageSystem = \sum_{i=0}^{M-1} \gamma_{Disk\ i} = \sum_{i=0}^{M-1}\sum_{j=0}^{M-1} \gamma_{Disk\ i, Disk\ j} \qquad \text{Formula 4}$$

where $\gamma_{StorageSystem}$ denotes the correlation of the storage system, $\gamma_{Disk\ i}$ denotes a device correlation of the ith storage device, $\gamma_{Disk\ i, Disk\ j}$ denotes a correlation between the ith storage device and the jth storage device, and M denotes the number of the storage devices in the storage system.

According to an example implementation of the present disclosure, an average device correlation $\gamma_{Disk\ average}$ of each storage device in the storage system may be determined based on the following formula 5. The meanings of the symbols in formula 5 are the same as those in formula 4.

$$\gamma Disk\ average = \frac{1}{M}\gamma StorageSystem = \frac{1}{M}\sum_{i=0}^{M-1} \gamma_{Disk\ i} \qquad \text{Formula 5}$$

According to an example implementation of the present disclosure, a standard deviation σ of a device correlation of each storage device in the storage system may be determined based on the following formula 6. The meanings of the symbols in formula 6 are the same as those in formula 4.

$$\sigma = \sqrt{\frac{\sum_{i=0}^{M-1}(\gamma_{Disk\ i} - \gamma_{Disk\ average})^2}{M-1}} \qquad \text{Formula 6}$$

When the four stripes are created based on method 500, each of the four stripes can be evenly distributed in the plurality of storage devices. Based on formula 6 above, it can be determined that a standard deviation of a correlation generated by method 500 is shown as formula 7:

$$\sigma = \sqrt{\frac{\sum_{i=0}^{M-1}(\gamma_{Disk\ i} - \gamma_{Disk\ average})^2}{M-1}} = 1.669 \qquad \text{Formula 7}$$

When the four stripes are created based on an existing polling method, extents in each of the four stripes are continuously distributed in the plurality of storage devices. at this time, matrix M1 of correlations of the storage system after the four stripes are created is expressed as follows:

$$M1 = \begin{bmatrix} 0 & 2 & 10 & 5 & 2 & 3 & 6 & 7 \\ 2 & 0 & 8 & 8 & 10 & 2 & 2 & 3 \\ 10 & 8 & 0 & 5 & 6 & 11 & 2 & 5 \\ 5 & 8 & 5 & 0 & 8 & 6 & 4 & 2 \\ 2 & 10 & 6 & 8 & 0 & 6 & 7 & 8 \\ 3 & 2 & 11 & 6 & 6 & 0 & 6 & 9 \\ 6 & 2 & 2 & 4 & 7 & 6 & 0 & 7 \\ 7 & 3 & 5 & 2 & 8 & 9 & 7 & 0 \end{bmatrix}$$

Based on formula 6 above, it can be determined that a standard deviation of a correlation caused by the polling method is shown as formula 8:

$$\sigma = \sqrt{\frac{\sum_{i=0}^{M-1}(\gamma_{Disk\ i} - \gamma_{Disk\ average})^2}{M-1}} = 8.311 \qquad \text{Formula 8}$$

When the four stripes are created based on an existing random method, extents in each of the four stripes are randomly distributed in the plurality of storage devices. At this time, matrix M2 of correlations of the storage system after the four stripes are created is expressed as follows:

$$M2 = \begin{bmatrix} 0 & 2 & 11 & 5 & 3 & 5 & 8 & 9 \\ 2 & 0 & 7 & 7 & 9 & 2 & 3 & 5 \\ 11 & 7 & 0 & 2 & 5 & 10 & 2 & 6 \\ 5 & 7 & 2 & 0 & 4 & 5 & 4 & 3 \\ 3 & 9 & 5 & 4 & 0 & 4 & 6 & 8 \\ 5 & 2 & 10 & 5 & 4 & 0 & 7 & 10 \\ 8 & 3 & 2 & 4 & 6 & 7 & 0 & 8 \\ 9 & 5 & 6 & 3 & 8 & 10 & 8 & 0 \end{bmatrix}$$

Based on formula 6 above, it can be determined that a standard deviation of a correlation caused by the random method is shown as formula 9:

$$\sigma = \sqrt{\frac{\sum_{i=0}^{M-1}(\gamma_{Disk\ i} - \gamma_{Disk\ average})^2}{M-1}} = 6.182 \qquad \text{Formula 9}$$

It can be known by comparing formulas 7 to 9 that the standard deviation of the correlation generated by method 500 is 1.669, while the standard deviations of the correlations generated based on the polling method and the random method are 8.311 and 6.182 respectively. The standard deviation of the correlation generated by method 500 is far lower than those generated by other methods. Thus, with the example implementation of the present disclosure, the created stripe can maintain the correlations of the plurality of storage devices at a low level, thereby ensuring that the workloads and performance of the plurality of storage devices are balanced as much as possible.

The examples of the method according to the present disclosure have been described in detail above with reference to FIG. 2 to FIG. 9, and the implementation of a corresponding apparatus will be described in the following. According to an example implementation of the present disclosure, an apparatus for managing stripes in a storage system is provided. The storage system includes a plurality of storage devices. The apparatus includes: a determining module configured to determine a device correlation of a storage device in the plurality of storage devices according to a request for creating a stripe in the storage system, the device correlation indicating distribution of a set of stripes created in the storage system between the storage device and other storage devices than the storage device; a selecting module configured to select a storage device from the plurality of storage devices based on the determined device correlation; and an adding module configured to add an extent in the selected storage device to the stripe. According to an example implementation of the present disclosure, the apparatus further includes modules for performing method 500 described above.

Figure 10:
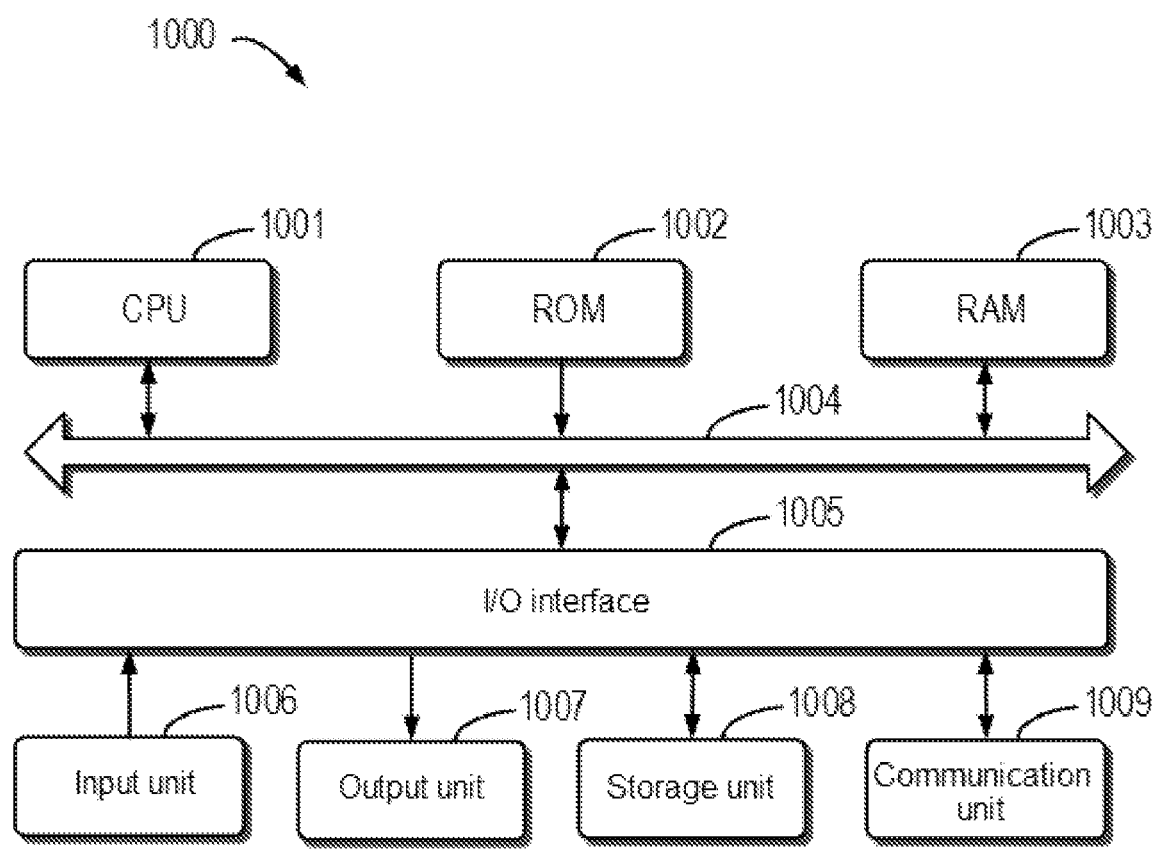
FIG. 10 schematically illustrates a block diagram of a device for managing stripes in a storage system according to an example implementation of the present disclosure.

FIG. 10 schematically illustrates a block diagram of device 1000 for managing stripes in a storage system according to an example implementation of the present disclosure. As shown in the figure, device 1000 includes central processing unit (CPU) 1001 that may perform various appropriate actions and processing according to a computer program instruction stored in read-only memory (ROM) 1002 or a computer program instruction loaded from storage unit 1008 into random access memory (RAM) 1003. RAM 1003 may further store various programs and data required for operations of device 1000. CPU 1001, ROM 1002, and RAM 1003 are connected to each other through bus 1004. Input/output (I/O) interface 1005 is also connected to bus 1004.

A plurality of components in device 1000 are connected to I/O interface 1005, including: input unit 1006, such as a keyboard and a mouse; output unit 1007, such as various types of displays and speakers; storage unit 1008, such as a magnetic disk and an optical disk; and communication unit 1009, such as a network card, a modem, and a wireless communication transceiver. Communication unit 1009 allows device 1000 to exchange information/data with other devices via a computer network such as the Internet and/or various telecommunication networks.

The various processes and processing described above, such as method 500, may be performed by processing unit 1001. For example, in some implementations, method 500 may be implemented as a computer software program that is tangibly included in a machine-readable medium, such as storage unit 1008. In some implementations, some or all of the computer programs may be loaded and/or installed onto device 1000 via ROM 1002 and/or communication unit 1009. One or more steps of method 500 described above may be performed when the computer program is loaded into RAM 1003 and executed by CPU 1001. Alternatively, in other implementations, CPU 1001 may also be configured to implement the above-described process/method in any other suitable manner.

According to an example implementation of the present disclosure, an electronic device is provided, including: at least one processor; and a memory coupled to the at least one processor. The memory has instructions stored therein. When executed by the at least one processor, the instructions cause the device to execute actions for managing stripes in a storage system. The storage system includes a plurality of storage devices. The actions include: determining a device correlation of a storage device in the plurality of storage devices according to a request for creating a stripe in the storage system, the device correlation indicating distribution of a set of stripes created in the storage system between the storage device and other storage devices than the storage device; selecting one storage device from the plurality of storage devices based on the determined device correlation; and adding one extent in the selected storage device to the stripe.

According to an example implementation of the present disclosure, determining the device correlation of the storage device in the plurality of storage devices includes: determining a correlation between the storage device and each of the other storage devices than the storage device respectively; and determining the device correlation of the storage device based on the determined correlations.

According to an example implementation of the present disclosure, determining the correlation between the storage device and each of the other storage devices than the storage device respectively includes: for one of the other storage devices, determining, in the set of stripes, the number of stripes which involve the storage device and the one of the other storage device; and setting a correlation between the storage device and the one of the other storage device based on the determined number.

According to an example implementation of the present disclosure, determining the device correlation of the storage device includes: setting the device correlation to be positively proportional to the correlation between the storage device and each of the other storage devices.

According to an example implementation of the present disclosure, selecting the storage device from the plurality of storage devices includes: selecting a first storage device according to determination that a first device correlation of the first storage device in the plurality of storage devices is lower than a second device correlation of a second storage device in the plurality of storage devices.

According to an example implementation of the present disclosure, the actions further include: in the plurality of storage devices, for a first set of storage devices which do not include any extent in the stripe, determining a stripe correlation between a given storage device in the first set of storage devices and the stripe; selecting one storage device from the first set of storage devices based on the determined stripe correlation; and adding one extent in the selected storage device to the stripe.

According to an example implementation of the present disclosure, determining the stripe correlation between the given storage device and the stripe includes: determining, in the plurality of storage devices, a second set of storage devices including each extent in the stripe respectively; and determining the stripe correlation between the given storage device and the stripe based on a correlation between the given storage device and each storage device in the second set of storage devices.

According to an example implementation of the present disclosure, selecting the storage device from the first set of storage devices based on the determined stripe correlation includes: selecting a first storage device according to determination that a first stripe correlation of the first storage device in the first set of storage devices is lower than a second stripe correlation of a second storage device in the first set of storage devices.

According to an example implementation of the present disclosure, selecting the storage device from the first set of storage devices based on the determined stripe correlation includes: selecting the storage device based on the stripe correlation and a device correlation of the storage device.

According to an example implementation of the present disclosure, determining the stripe correlation between the given storage device in the first set of storage devices and the stripe includes: determining the stripe correlation between the given storage device in the first set of storage devices and the stripe according to determination that the number of extents in the stripe does not satisfy a width of the stripe.

According to an example implementation of the present disclosure, a computer program product is provided. The computer program product is tangibly stored on a non-transitory computer-readable medium and includes machine-executable instructions that are configured to perform the method according to the present disclosure.

According to an example implementation of the present disclosure, a computer-readable medium is provided. Machine-executable instructions are stored on the computer-readable medium, and when executed by at least one processor, the machine-executable instructions cause the at least one processor to implement the method according to the present disclosure.

The present disclosure may be a method, a device, a system, and/or a computer program product. The computer program product may include a computer-readable storage medium storing computer-readable program instructions for performing various aspects of the present disclosure.

The computer-readable storage medium may be a tangible device capable of retaining and storing instructions used by an instruction-executing device. For example, the computer-readable storage medium may be, but is not limited to, an electrical storage device, a magnetic storage device, an optical storage device, an electromagnetic storage device, a semiconductor storage device, or any appropriate combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium as used herein is not explained as transient signals themselves, such as radio waves or other electromagnetic waves propagated freely, electromagnetic waves propagated through waveguides or other transmission media (e.g., light pulses propagated through fiber-optic cables), or electrical signals transmitted over electrical wires.

The computer-readable program instructions described here may be downloaded from the computer-readable storage medium to various computing/processing devices or downloaded to external computers or external storage devices over a network such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, including object oriented programming languages such as Smalltalk and C++ as well as conventional procedural programming languages such as the "C" language or similar programming languages. The computer-readable program instructions may be executed completely on a user's computer, partially on a user's computer, as a separate software package, partially on a user's computer and partially on a remote computer, or completely on a remote computer or server. In the case where a remote computer is involved, the remote computer may be connected to a user computer over any kind of networks, including a local area network (LAN) or wide area network (WAN), or may be connected to an external computer (e.g., connected over the Internet using an Internet service provider). In some implementations, an electronic circuit, such as a programmable logic circuit, a field programmable gate array (FPGA), or a programmable logic array (PLA), may be customized by utilizing state information of the computer-readable program instructions. The computer-readable program instructions are executable by the electronic circuit to implement various aspects of the present disclosure.

Various aspects of the present disclosure are described here with reference to flowcharts and/or block diagrams of the method, the apparatus (system), and the computer program product implemented according to the present disclosure. It should be understood that each block in the flowcharts and/or block diagrams and a combination of blocks in the flowcharts and/or block diagrams may be implemented by computer program instructions.

The computer-readable program instructions may be provided to a processing unit of a general-purpose computer, a special-purpose computer, or another programmable data processing apparatus to produce a machine such that the instructions, when executed by the processing unit of the computer or another programmable data processing apparatus, generate an apparatus for implementing the functions/actions specified in one or more blocks in the flowchart and/or block diagrams. The computer-readable program instructions may also be stored in a computer-readable storage medium, and the instructions cause the computer, another programmable data processing apparatus, and/or other devices to work in a specific manner, such that the computer-readable medium storing the instructions includes an article of manufacture including instructions for implementing various aspects of functions/actions specified by one or more blocks in the flowcharts and/or block diagrams.

The computer-readable program instructions may also be loaded onto a computer, another programmable data processing apparatus, or another device, such that a series of operational steps are performed on the computer, another programmable data processing apparatus, or another device to produce a computer implemented process. As such, the instructions executed on the computer, the another programmable data processing apparatus, or the another device implement the functions/actions specified in one or more blocks in the flowcharts and/or block diagrams.

The flowcharts and block diagrams in the accompanying drawings illustrate the architectures, functions, and operations of possible implementations of systems, methods, and computer program products according to multiple implementations of the present disclosure. In this regard, each block in the flowcharts or block diagrams may represent a module, a program segment, or a portion of an instruction that includes one or more executable instructions for implementing the specified logical functions. In some alternative implementations, functions labeled in the blocks may occur in an order different from that as labeled in the accompanying drawings. For example, two successive blocks may actually be performed basically in parallel, or they may be performed in an opposite order sometimes, depending on the functions involved. It also should be noted that each block in the block diagrams and/or flowcharts, and a combination of blocks in the block diagrams and/or flowcharts may be implemented using a dedicated hardware-based system for executing specified functions or actions, or may be implemented using a combination of dedicated hardware and computer instructions.

Various implementations of the present disclosure have been described above, and the foregoing description is illustrative rather than exhaustive, and is not limited to the disclosed implementations. Numerous modifications and changes are apparent to those of ordinary skill in the art without departing from the scope and spirit of the various illustrated implementations. The selection of terms as used herein is intended to best explain the principles and practical applications of the various implementations, or the improvements to technologies on the market, or to enable other persons of ordinary skill in the art to understand the implementations disclosed here.

The invention claimed is:

1. A method for managing stripes in a storage system, the storage system comprising a plurality of storage devices, and the method comprising:
for each storage device in the plurality of storage devices, determining a device correlation of the storage device according to a request for creating a stripe in the storage system, at least in part by determining a correlation between the storage device and each other storage device in the plurality of storage devices equal to a number of stripes which involve both the storage device and the other storage device, wherein the device correlation of each storage device in the plurality of storage devices comprises a sum of the correlations determined between that storage device and the other storage devices in the plurality of storage devices;
selecting one storage device from the plurality of storage devices based on the determined device correlations; and
adding one extent in the selected storage device to the stripe.

2. The method of claim 1, wherein determining the device correlation of each storage device further comprises:
setting the device correlation to be positively proportional to the correlation between the storage device and each of the other storage devices.

3. The method of claim 1, wherein selecting one storage device from the plurality of storage devices comprises:
selecting a storage device according to determination that a device correlation of the selected storage device is lower than a device correlation of at least one other storage device in the plurality of storage devices.

4. The method of claim 1, further comprising:
in the plurality of storage devices, for a first set of storage devices which do not comprise any extent used in the stripe, determining a stripe correlation between a given storage device in the first set of storage devices and the stripe;
selecting one storage device from the first set of storage devices based on the determined stripe correlation; and
adding one extent in the selected storage device to the stripe.

5. The method of claim 4, wherein determining the stripe correlation between the given storage device and the stripe comprises:
determining, in the plurality of storage devices, a second set of storage devices comprising each extent used in the stripe respectively; and
determining the stripe correlation between the given storage device and the stripe based on a correlation between the given storage device and each storage device in the second set of storage devices.

6. The method of claim 4, wherein selecting the storage device from the first set of storage devices based on the determined stripe correlation comprises:
selecting a first storage device according to determination that a first stripe correlation of the first storage device in the first set of storage devices is lower than a second stripe correlation of a second storage device in the first set of storage devices.

7. The method of claim 4, wherein selecting the storage device from the first set of storage devices based on the determined stripe correlation comprises:
selecting the storage device based on the stripe correlation and a device correlation of the storage device.

8. The method of claim 4, wherein determining the stripe correlation between the given storage device in the first set of storage devices and the stripe further comprises:
determining the stripe correlation between the given storage device in the first set of storage devices and the stripe according to determination that the number of extents in the stripe does not satisfy a width of the stripe.

9. An electronic device, comprising:
at least one processor; and
a memory coupled to the at least one processor, the memory having instructions stored therein, when executed by the at least one processor, the instructions cause the device to execute actions for managing stripes in a storage system, the storage system comprising a plurality of storage devices, and the actions comprising:
for each storage device in the plurality of storage devices, determining a device correlation of the storage device according to a request for creating a stripe in the storage system, at least in part by determining a correlation between the storage device and each other storage device in the plurality of storage devices equal to a number of stripes which involve both the storage device and the other storage device, wherein the device correlation of each storage device in the plurality of storage devices comprises a sum of the correlations determined between that storage device and the other storage devices in the plurality of storage devices;
selecting one storage device from the plurality of storage devices based on the determined device correlations; and
adding one extent in the selected storage device to the stripe.

10. The device of claim 9, wherein determining the device correlation of each storage device further comprises: setting the device correlation to be positively proportional to the correlation between the storage device and each of the other storage devices.

11. The device of claim 9, wherein selecting one storage device from the plurality of storage devices comprises:
selecting a storage device according to determination that a device correlation of the selected storage device is lower than a device correlation of at least one other storage device in the plurality of storage devices.

12. The device of claim 9, wherein the actions further comprise:

in the plurality of storage devices, for a first set of storage devices which do not comprise any extent used in the stripe, determining a stripe correlation between a given storage device in the first set of storage devices and the stripe;

selecting one storage device from the first set of storage devices based on the determined stripe correlation; and adding one extent in the selected storage device to the stripe.

13. The device of claim 12, wherein determining the stripe correlation between the given storage device and the stripe comprises:

determining, in the plurality of storage devices, a second set of storage devices comprising each extent used in the stripe respectively; and determining the stripe correlation between the given storage device and the stripe based on a correlation between the given storage device and each storage device in the second set of storage devices.

14. The device of claim 12, wherein selecting the storage device from the first set of storage devices based on the determined stripe correlation comprises:

selecting a first storage device according to determination that a first stripe correlation of the first storage device in the first set of storage devices is lower than a second stripe correlation of a second storage device in the first set of storage devices.

15. The device of claim 12, wherein selecting the storage device from the first set of storage devices based on the determined stripe correlation comprises:

selecting the storage device based on the stripe correlation and a device correlation of the storage device.

16. A computer program product having a non-transitory computer readable medium which stores a set of instructions to manage stripes in a storage system, the storage system comprising a plurality of storage devices; the set of instructions, when carried out by computerized circuitry, causing the computerized circuitry to perform a method of:

for each storage device in a plurality of storage devices, determining a device correlation of the storage device according to a request for creating a stripe in the storage system, at least in part by determining a correlation between the storage device and each other storage device in the plurality of storage devices equal to a number of stripes which involve both the storage device and the other storage device, wherein the device correlation of each storage device in the plurality of storage devices comprises a sum of the correlations determined between that storage device and the other storage devices in the plurality of storage devices;

selecting one storage device from the plurality of storage devices based on the determined device correlations; and adding one extent in the selected storage device to the stripe.

* * * * *